United States Patent
Chen

(10) Patent No.: US 7,639,441 B1
(45) Date of Patent: Dec. 29, 2009

(54) LENS MODULE WITH DRIVING MECHANISM FOR LENSES

(75) Inventor: Kao-Chi Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/407,118

(22) Filed: Mar. 19, 2009

(30) Foreign Application Priority Data

Jun. 4, 2008 (CN) .................... 2008 1 0302020

(51) Int. Cl.
*G02B 7/02* (2006.01)
(52) U.S. Cl. ...................... 359/824; 359/814
(58) Field of Classification Search .............. 359/824, 359/819, 821, 822, 823, 811, 813, 814
See application file for complete search history.

(56) References Cited

U.S. PATENT DOCUMENTS

2008/0259468 A1* 10/2008 Chung ..................... 359/814

* cited by examiner

*Primary Examiner*—Timothy J Thompson
(74) *Attorney, Agent, or Firm*—Clifford O. Chi

(57) ABSTRACT

An exemplary lens module includes one or more lenses, a hollow stationary assembly, a hollow elastic member, and a hollow movable assembly. The one or more lenses are received in the hollow movable assembly. The stationary assembly includes a first magnetic field generator, and two spaced guiding rods defined on the first magnetic field generator. The hollow elastic member is attached onto the first magnetic field generator. The hollow elastic member has two engaging holes and two flexible portions. The movable assembly includes a second magnetic field generator and two guiding holes. The flexible portions are attached to the second magnetic field generator, and the guiding rods extend through the engaging holes and the guiding holes.

16 Claims, 4 Drawing Sheets

LENS MODULE WITH DRIVING MECHANISM FOR LENSES

BACKGROUND

1. Technical Field

The present disclosure relates to lens modules, and particularly, to a lens module having a driving mechanism for lenses.

2. Description of Related Art

With the ongoing development of microcircuitry and multimedia technology, camera modules, including, e.g., still camera modules and digital camera modules, are now in widespread use and are being combined with various electronic devices. These camera modules are usually required to have autofocus and sometimes a zoom function as well.

Lens modules and image sensors are key components in camera modules. A typical lens module includes a lens assembly and a driving mechanism. The lens assembly includes at least one lens. The driving mechanism can be, e.g., a step motor configured for driving the lens to move relative to the image sensor, thereby achieving the autofocus or zoom function of the camera module. However, a typical step motor is heavy and bulky, and consumes a substantial amount of power, especially relative to the amount of power that can be stored in a typical battery system of a camera or an electronic device.

What is needed, therefore, is a lens module which can overcome the above shortcomings.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF EMBODIMENTS

Embodiments of the present lens module will now be described in detail below and with reference to the drawings.

Figure 1:
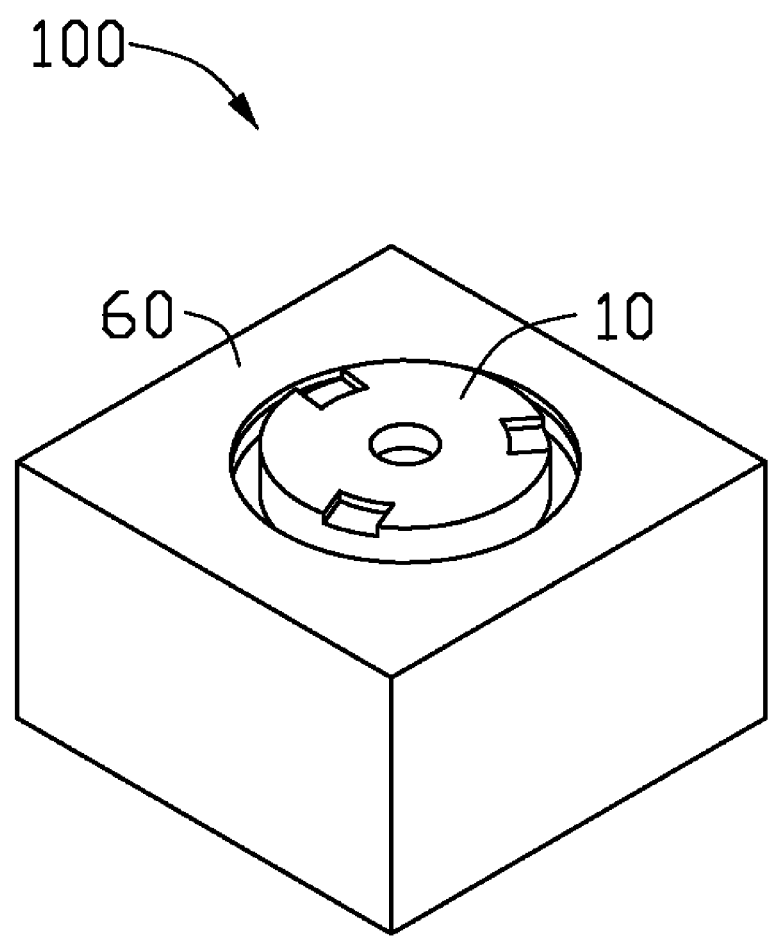
FIG. 1 is a schematic, isometric view of a lens module in accordance with an embodiment.
Figure 2:
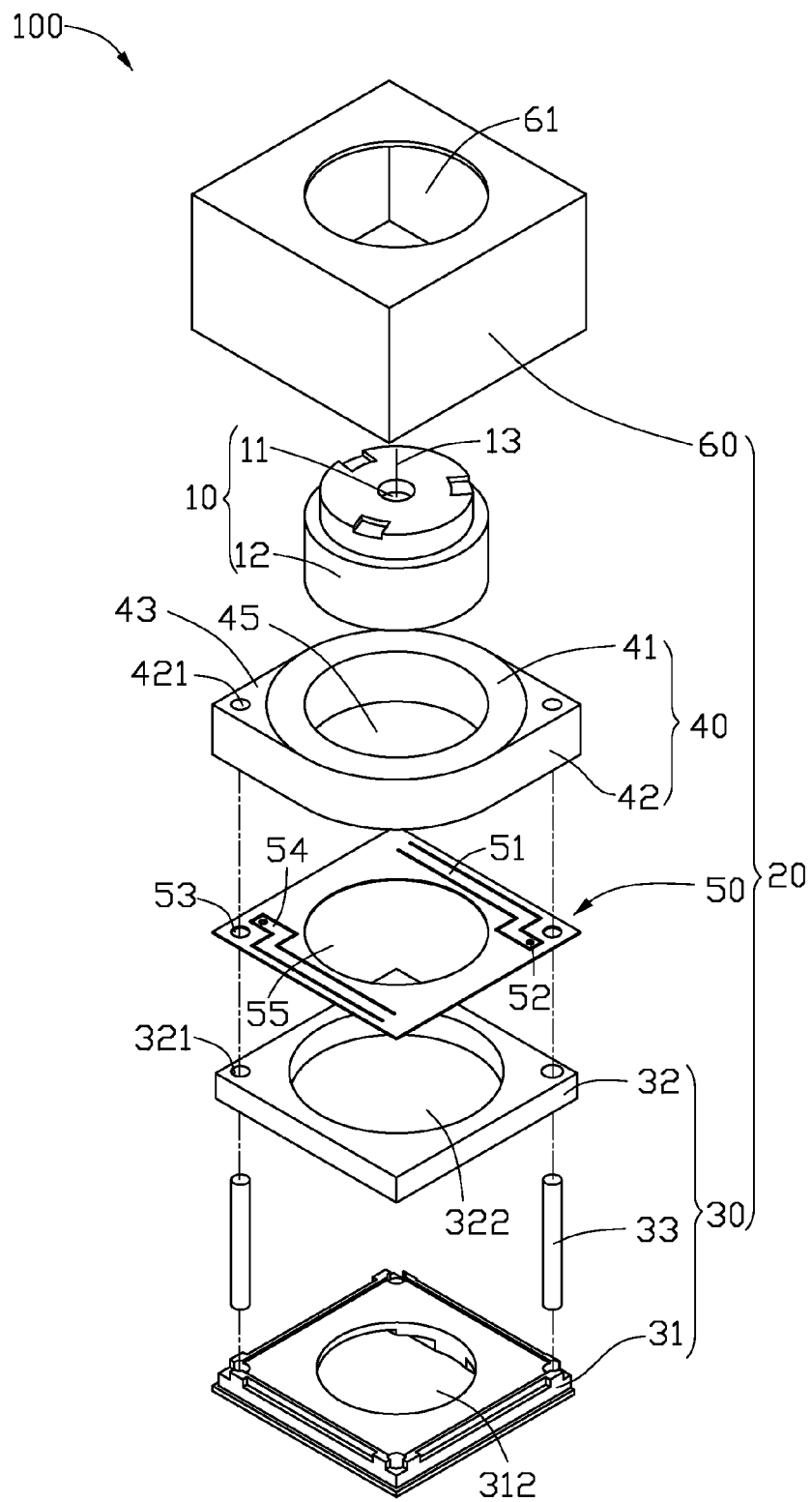
FIG. 2 is an exploded view of the lens module of FIG. 1, showing (inter alia) a movable assembly and an elastic member.

Referring to FIGS. 1 and 2, an exemplary lens module 100 includes a lens assembly 10, and a driving mechanism 20 for driving the lens assembly 10. In the present embodiment, the lens assembly 10 includes a lens barrel 12 receiving a lens 11. The lens 11 defines an optical axis 13.

The driving mechanism 20 includes a stationary assembly 30, a movable assembly 40, an elastic member 50, and a hollow case 60.

The stationary assembly 30 includes a base 31, a first magnetic field generator 32, and two guiding rods 33. The base 31 is generally square-shaped, and has a first through hole 312 defined in a center thereof. The guiding rods 33 are attached onto diagonally opposite corners of the base 31. A lengthwise direction of the guiding rods 33 is parallel to the optical axis 13 of the lens 11. The first magnetic field generator 32 is a permanent magnet substrate generally having the same shape as the base 31. The first magnetic field generator 32 has a second through hole 322 defined in a center thereof. Two first engaging holes 321 are defined in diagonally opposite corners of the first magnetic field generator 32. The first magnetic field generator 32 is attached onto the base 31 with the guiding rods 33 extending through the respective first engaging holes 321.

Figure 4:
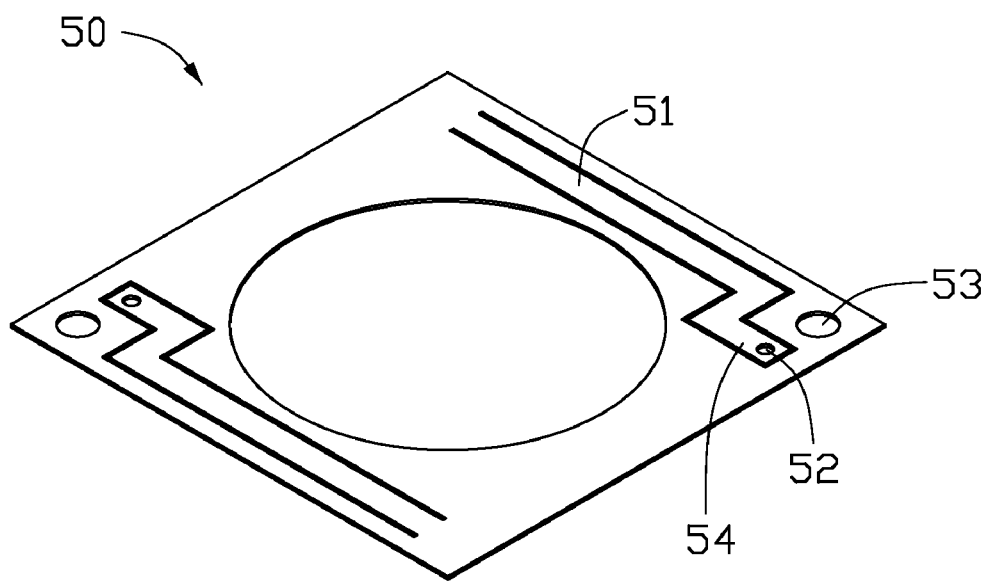
FIG. 4 is an enlarged view of the elastic member of FIG. 2.

Referring also to FIG. 4, the elastic member 50 is a rectangular sheet. The elastic member 50 includes a third through hole 55 defined in a center thereof, two flexible portions 51 adjacent to the third through hole 55, and two second engaging holes 53. The two second engaging holes 53 are defined in diagonally opposite corners of the elastic member 50. The two flexible portions 51 are oriented in radial symmetry about a center of the third through hole 55. In the illustrated embodiment, the flexible portions 51 are arranged as if one has been rotated 180° about the center of the third through hole 55 from the other. The flexible portions 51 each has a free end 54. In the illustrated embodiment, the free end 54 is in the form of an L-shaped section extending perpendicularly from an elongated strip-shaped main section of the flexible portion 51. The free ends 54 are adjacent to the second engaging holes 53, respectively. The free ends 54 each have a leading hole 52 defined therein. The elastic member 50 is attached to the first magnetic field generator 32 with the guiding rods 33 extending through the respective second engaging holes 53.

The movable assembly 40 includes an annular second magnetic field generator 41 and two guiding blocks 42. The second magnetic field generator 41 defines a fourth through hole 45. The guiding blocks 42 are attached to two opposite outer sides of the second magnetic field generator 41, and are diagonally opposite each other across the fourth through hole 45. The second magnetic field generator 41 includes an annular iron core, and one or more wire coils (not shown) wrapped around the iron core. The guiding blocks 42 each have a top surface 43, a bottom surface 44, and a guiding hole 421 defined through the top surface 43 and the bottom surface 44. The lens assembly 10 is received in the fourth through hole 45, and is attached therein. The guiding rods 33 are slidably received in the respective guiding holes 421.

Figure 3:
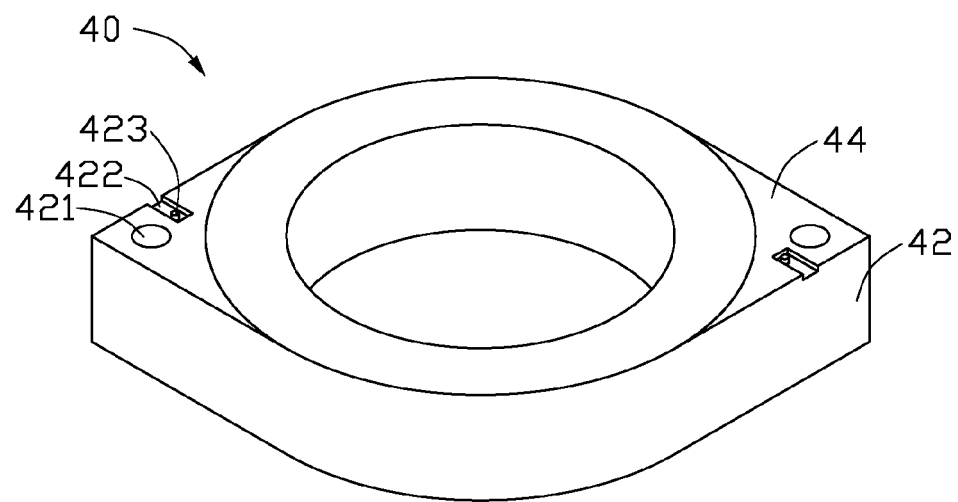
FIG. 3 is an isometric view of the movable assembly of FIG. 2 after the movable assembly has been inverted.

Referring also to FIG. 3, two recesses 422 are formed in the bottom surface 44 of the guiding blocks 42, adjacent to the respective guiding holes 421; and two leading pins 423 are formed in the respective recesses 422. The free ends 54 of the flexible portions 51 are received in the respective recesses 422, and the leading pins 423 engage in the respective leading holes 52.

The hollow case 60 has a fifth through hole 61 defined in a top wall thereof. The hollow case 60 contains the stationary assembly 30, the elastic member 50, the movable assembly 40, and the lens assembly 10, with part of the lens assembly 10 protruding out from the through hole 61.

The case 60 and the base 31 can be made from an electromagnetic interference material, such as an alloy of nickel and iron. The case 60 and the base 31 cooperatively form a package for the entire driving mechanism 20.

The stationary assembly 30, the movable assembly 40, and the elastic member 50 are connected by the guiding rods 33, thus the entire driving mechanism 20 can be compact.

When a current is applied in a certain direction to the second magnetic field generator 41, such that a direction of the magnetic field generated by the second magnetic field generator 41 is essentially the same as that of the magnetic field generated by the first magnetic field generator 32, the second magnetic field generator 41 together with the lens assembly 10 is repelled along the guiding rods 33 away from the first magnetic field generator 32. When a current is applied in the opposite direction to the second magnetic field generator 41, a direction of the magnetic field generated by the second magnetic field generator 41 opposes that of the magnetic field generated by the first magnetic field generator 32. In this case, the second magnetic field generator 41 together with the lens assembly 10 can be attracted along the guiding rods 33 toward the first magnetic field generator 32. In this way, the lens assembly 10 is moved.

The guiding rods 33 ensure that directions of movement of the movable assembly 40 and the lens assembly 10 are along the optical axis 13 of the lens 11. The flexible portions 51 of the elastic member 50 can provide cushioning for upward and downward movement of the movable assembly 40.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A lens module, comprising:
   at least one lens defining an optical axis;
   a stationary assembly comprising a first magnetic field generator having a first through hole defined therein, and a plurality of spaced guiding rods provided at the first magnetic field generator around the first through hole, the guiding rods being oriented substantially parallel to the optical axis of the at least one lens, the first magnetic field generator capable of generating a first magnetic field;
   an elastic member having a second through hole defined therein, a plurality of flexible portions formed in the elastic member adjacent to the second through hole, and a plurality of first engaging holes adjacent to the respective flexible portions, the guiding rods extending through the first engaging holes, the flexible portions each having a free end; and
   a movable assembly comprising a second magnetic field generator having a third through hole defined therein receiving the at least one lens, and a plurality of guiding holes adjacent to the third through hole, the free ends of the flexible portions coupled to the movable assembly, the guiding rods slidably received in the guiding holes, the second magnetic field generator capable of generating a second magnetic field, wherein a direction of the second magnetic field is selectably one of essentially the same as a direction of the first magnetic field, whereby the second magnetic field generator together with the at least one lens is capable of moving along the guiding rods away from the first magnetic field generator, and essentially opposing the direction of the first magnetic field, whereby the second magnetic field generator together with the at least one lens is capable of moving along the guiding rods toward the first magnetic field generator.

2. The lens module as described in claim 1, wherein the stationary assembly further comprises a hollow base, the first magnetic field generator having at least two second engaging holes adjacent to the first through hole, the guiding rods attached onto the base, and the first magnetic field generator attached onto the base with the guiding rods extending through the second engaging holes.

3. The lens module as described in claim 2, wherein the guiding rods are attached onto diagonally opposite corners of the base, and the first engaging holes and the second engaging holes are defined in diagonally opposite corners of the elastic member and the first magnetic field generator, respectively.

4. The lens module as described in claim 1, wherein the first magnetic field generator comprises a permanent magnet substrate, and the second magnetic field generator comprises an electromagnet ring.

5. The lens module as described in claim 1, wherein the movable assembly further comprises at least two guiding blocks attached to the second magnetic field generator, the guiding blocks each having one of the guiding holes defined therein.

6. The lens module as described in claim 5, wherein the free ends of the flexible portions each have a leading hole defined therein, and the guiding blocks each have a recess formed in a surface thereof and a leading pin formed in the recess, the recesses receiving the respective free ends of the flexible portions, and the leading pins engaging in the leading holes.

7. The lens module as described in claim 1, wherein the free ends of the flexible portions are adjacent to the first engaging holes of the elastic member.

8. The lens module as described in claim 1, further comprising a hollow case receiving the stationary assembly, the elastic member and the movable assembly therein.

9. The lens module as described in claim 1, wherein the elastic member is a rectangular sheet.

10. The lens module as described in claim 9, wherein the free end of each of the flexible portions is in the form of an L-shaped section extending perpendicularly from an elongated strip-shaped main section of the flexible portion.

11. The lens module as described in claim 1, wherein the flexible portions are oriented in radial symmetry about a center of the second through hole.

12. A lens module, comprising:
    at least one lens having an optical axis;
    a lens barrel receiving the at least one lens therein;
    a stationary assembly comprising a base having a first through hole defined therein, a stationary magnetic field generator having a second through hole and a plurality of first engaging holes defined therein, and a plurality of spaced guiding rods attached on the base and extending through the first engaging holes, the guiding rods being oriented essentially parallel to the optical axis of the at least one lens;
    an elastic member having a third through hole defined therein, a plurality of flexible portions formed in the elastic member and oriented in radial symmetry about a center of the third through hole, and a plurality of second engaging holes, the flexible portions each having a free end adjacent to the first engaging holes, respectively, the elastic member attached onto the first magnetic field generator with the guiding rods extending through the second engaging holes; and
    a movable assembly comprising a variable magnetic field generator having a third through hole defined therein receiving the lens barrel, and a plurality of guiding holes adjacent to the third through hole, the free ends of the flexible portions coupled to the movable assembly, and the guiding rods being slidably received in the guiding holes, wherein each of the stationary magnetic field generator and the variable magnetic field generator are capable of generating a magnetic field and when the magnetic fields interact with each other they drive the movable assembly to move along the guiding rods.

13. The lens module as described in claim 12, wherein the first magnetic field generator comprises a permanent magnet substrate, and the second magnetic field generator comprises an electromagnet ring.

14. The lens module as described in claim 12, wherein the movable assembly further comprises at least two guiding blocks attached to the second magnetic field generator, the guiding blocks each having one of the guiding holes defined therein.

15. The lens module as described in claim 12, wherein the elastic member is a rectangular sheet.

16. The lens module as described in claim 15, wherein the free end of each of the flexible portions is in form of an L-shaped section extending perpendicularly from an elongated strip-shaped main section of the flexible portion.

\* \* \* \* \*